Figure 4:
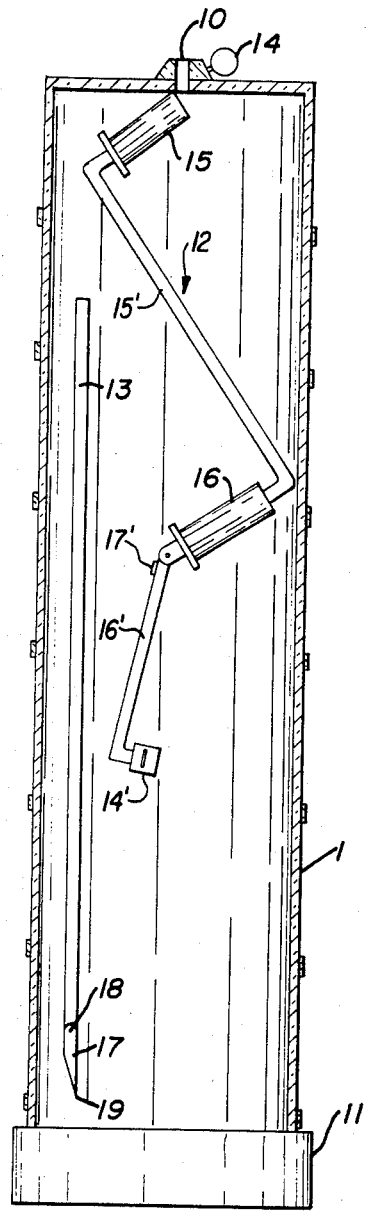

United States Patent [19]

Jarvi et al.

[11] Patent Number: 4,539,750
[45] Date of Patent: Sep. 10, 1985

[54] ICE CUTTER AND CORER

[76] Inventors: Reino E. Jarvi, P.O. Box 38, Foleyet, Ontario, Canada, P0N 1T0; Phillip G. L. Tremblay, P.O. Box 852, Timmins, Ontario, Canada

[21] Appl. No.: 497,700

[22] Filed: May 24, 1983

[30] Foreign Application Priority Data

Nov. 22, 1982 [CA] Canada .................. 416078

[51] Int. Cl.³ .................. B25F 3/00; F25C 5/04; B23B 41/00
[52] U.S. Cl. .................. 30/300; 175/18; 408/204
[58] Field of Search .................. 30/140, 300; 114/40; 175/18, 19; 408/204, 206, 207, 230

[56] References Cited

U.S. PATENT DOCUMENTS

| 51,252 | 11/1865 | Myckoff | 408/204 |
| 53,722 | 8/1866 | Myckoff | 408/204 |
| 2,880,968 | 4/1959 | Titeca | 175/18 |
| 2,955,805 | 10/1960 | Jones, Jr. et al. | 175/18 |
| 3,025,917 | 3/1962 | Knoblauch | 175/18 |
| 3,096,832 | 7/1963 | Westre | 175/18 |
| 3,430,456 | 3/1969 | Stricker | 175/18 |
| 4,294,183 | 10/1981 | Morgan | 175/18 |

FOREIGN PATENT DOCUMENTS

| 720240 | 10/1965 | Canada | 175/18 |
| 140496 | 3/1953 | Sweden | 175/18 |

Primary Examiner—Paul A. Bell
Assistant Examiner—Paul M. Heyrana, Sr.
Attorney, Agent, or Firm—Handal & Morofsky

[57] ABSTRACT

The invention relates to apparatus for cutting and removing a core of ice from an expanse of natural ice such as, for example, a lake or river so that fishing can be accomplished through the remaining open hole. The apparatus consists of a cylinder with ice-cutting teeth on its lower end, lands around its periphery and a handle employed for rotating the cylinder.

6 Claims, 6 Drawing Figures

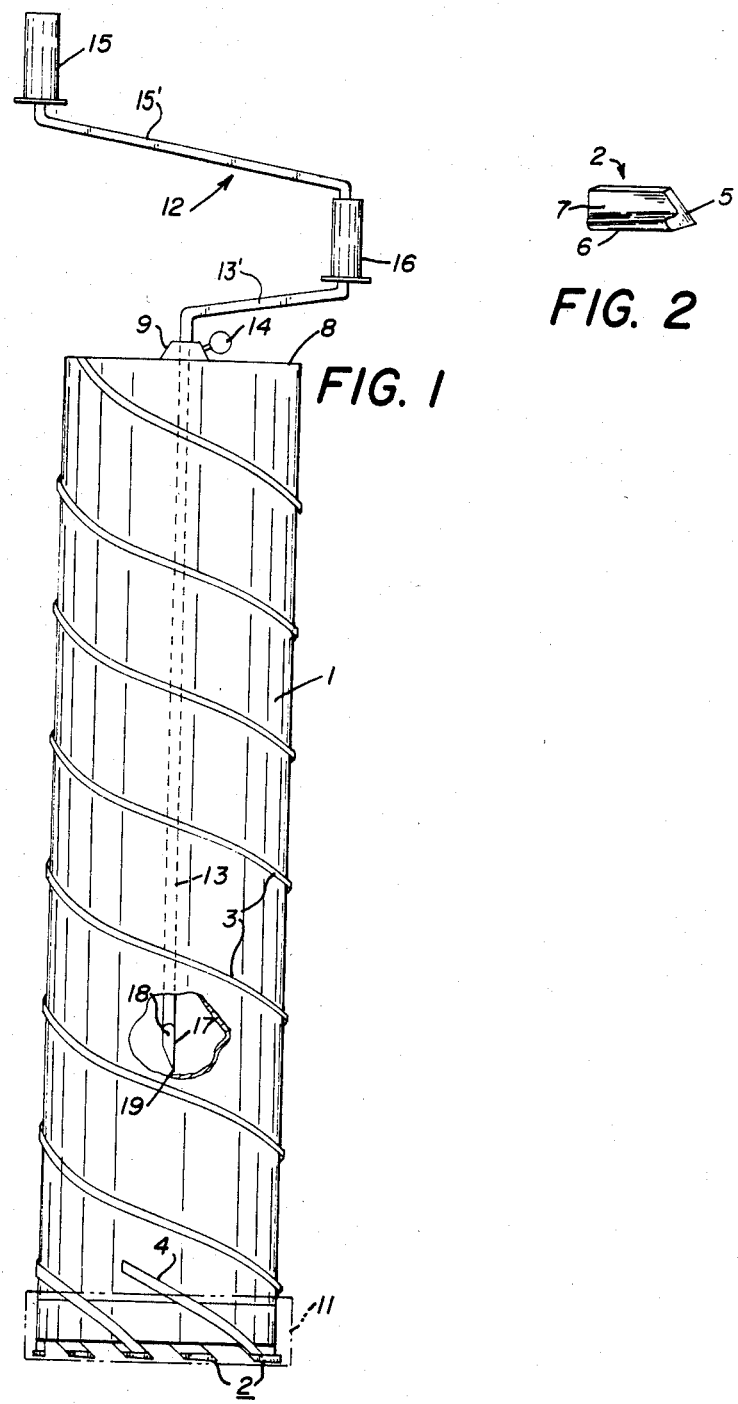

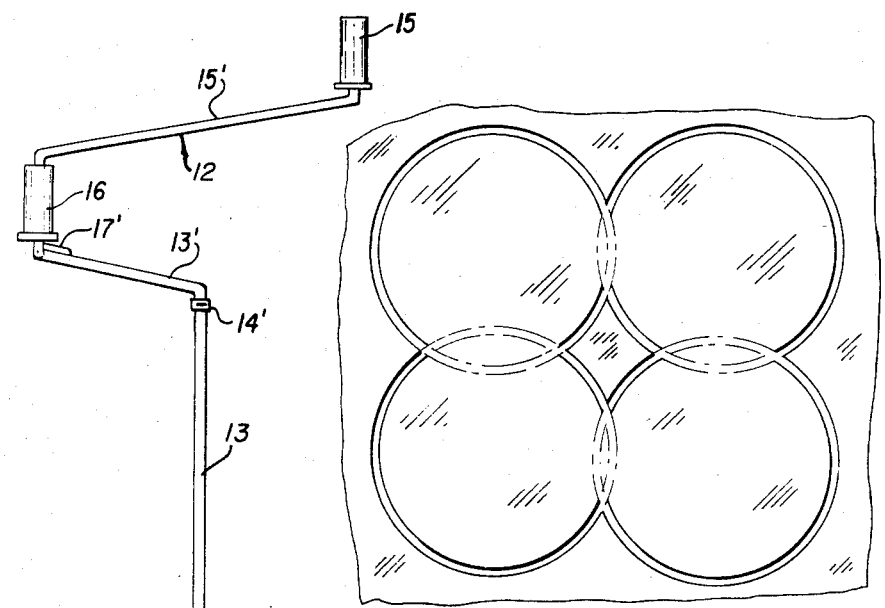
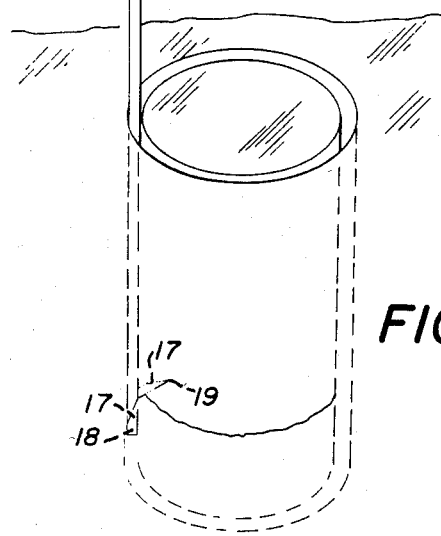
FIG. 6
FIG. 5

ICE CUTTER AND CORER

The invention relates to a combined ice-cutter and corer for use in conjunction with the winter sport of ice-fishing.

Obviously, and as is well known by ice-fishing sportsmen, a hole must be cut in the ice before the winter sport can be commenced. In the Northern Hemisphere, particularly Canada, the northern states of the U.S.A., Scandinavia, northern Europe, and parts of the U.S.S.R., the depth of ice on lakes and rivers can be extremely thick such as, for example, half a meter or more. To cut a hole in such thickness of ice can be extremely arduous in sub-zero temperatures.

One type of ice-auger previously known, is that described and illustrated in Canadian Pat. No. 946,824 which issued to Uuno Rantanen on May 7, 1974 and which consists of a cylindrical body having a single ice-removal helix on its outer periphery and a detachable blade on its lower end. This tool, however, does not remove an actual core of ice, thereby leaving a clean-cut hole with an absense of ice-swarf around it, but provides a hole surrounded by ice-swarf which must be removed in order that the fishing site can be presented in a clean condition.

Thus, it is the object of the present invention to provide a tool which will overcome the above disadvantages and which will be relatively inexpensive to manufacture and easy to operate.

Accordingly, the present invention relates to a combined ice-cutter and corer including a hollow, cylindrical body; a plurality of ice-cutting teeth on one end of said body; handle means on the end of the body remote from said teeth for rotating said body and cutting said core for entry into said body; and a plurality of lands on the outer periphery of said body to assist in the removal of ice-swarf during a cutting operation.

Figure 3:
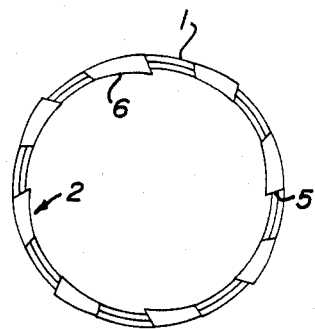

The invention is illustrated diagrammatically, and by way of example, in the accompany drawings in which:

FIG. 1 is a part-sectional side view of the tool;
FIG. 2 is a detail view of an ice-cutting tooth;
FIG. 3 is an underside view of FIG. 1;
FIG. 4 is a detail view of the handle parts shown within the cutter;
FIG. 5 is a detail view of the tool shown in one stage of its cuttting operation;
FIG. 6 shows overlapping holes from which the cores have been removed.

Referring to the drawings, and in particular FIG. 1, the combined ice-cutter and corer includes a hollow, cylindrical body 1 having a plurality of circumferentially spaced ice-cutting teeth indicated generally at 2, detachably secured to its lower end and a plurality of primary helical lands 3 on its outer periphery. A secondary land 4 is located between the lowermost pair of primary lands 3 and its purpose will also be described hereinafter.

Each tooth 2 is provided with axial cutting face 5, a circumferential cutting face 6 (both of which are shown more clearly in FIG. 2) and a grooved surface 7, the purposes of which will be described hereinafter.

It will be seen from the reference of FIG. 3, that alternate teeth 2 project slightly beyond the outer periphery of the body 1 whereas the teeth intermediate said alternate teeth project slightly beyond the inner periphery of said body so that when operative, the width of the cut made by all of said teeth is substantially equal to the overall width of the cutting faces 5 of each pair of adjacent teeth.

The upper end of the body 1, which is preferably of high grade steel, is closed by means of an end cap 8 provided with a boss 9 which has a central bore 10 (FIG. 4) of square cross-section. The lower end of the body 1 is provided with a snap-on detachable circumferential shield 11 (indicated in chain lines in FIG. 1 and in full lines in FIG. 4) covering the teeth 2 in order to prevent damage during transit or while the tool is stored.

In the preferred embodiment illustrated, handle means, indicated generally at 12, are provided for rotating the body 1 in order to cut the ice and to form the core. These means include a spindle 13 of square cross-section which is axially slidable within the bore 10 of the boss. The spindle 13, as shown in FIG. 1, may have a cranked upper portion 13' secured to a lower handle 16 of the handle means 12 or, as shown in FIG. 4, it can be indirectly attached to said lower handle 16 by a ratchet 14' on an intermediate arm 16' pivoted to handle 15. The intermediate arm 16' is provided with a stop 17' adapted to abut the underside of handle 16 when the cutter is operative. Handle 16 is connected to an upper handle 15 by means of a further cranked portion 15' forming part of the handle means.

An ice-probe 17 is pivotally mounted on the lower end of the spindle 13 at 18 and is provided with a pointed end 19. The handle means 12 can be secured in any desired vertical position in relation to the body 1 by means of a manually adjustable thumb screw 14 when the terminal end of the latter frictionally engages the spindle 13 and, hence, will maintain it at the required position within said body.

The body 1 and its lands 3 and 4, end cap 8 and shield 11, are preferably coated with any suitable thermoplastic material such as, for example, polyethylene or polytetrofluroethylene so as to inhibit those parts of the tool from adhering to the hands of the operator when used in sub-zero temperatures and to inhibit the core from adhering to the interior of the tool. The upper and lower handles 15, 16, are of course of any suitable thermo-setting material such as, for example, butadiene. All the handle and probe components can be stored within the casing 1 as shown in FIG. 4 for ease in storage and transportation of the combined cutter and corer.

In operation, the spindle 13 is secured at the desired depth within the body 1 by means of the screw 14 and in this position, as is shown in FIG. 1, the probe 17 will depend from the end of the spindle substantially in axial alignment therewith. The operator then removes the shield 11 and places the tool in a substantially vertical position in relation to the surface of the ice to be cut.

The operator then commences to turn the handle means 12 which will cause the teeth 2 to commence cutting the ice with the face 5 of each tooth cutting axially and the face 6 of each tooth cutting circumferentially. The ice-swarf will enter the grooved surface 7 of each tooth and will be helically directed upwardly by the primary lands 3, with the secondary land 4 initially directing the swarf between the two lowermost lands 3.

As the tool penetrates the ice, the axial faces 5 of the teeth 2 will cause the core of ice to enter the body 1 and once the cutter has penetrated through the thickness of the ice (providing of course that the said thickness is not greater than the depth of the interior of the casing 1), the cutter and core can be swiftly and easily removed inasmuch as suction will retain the core within the casing.

Should the thickness of the ice be greater than the operating depth of the tool, the latter is immediately lifted and removed when its limit of depth as been reached. Thereafter, the spindle 13 and its component parts is entirely removed from the casing 1 and inserted into the groove cut by the tool (see FIG. 5) but with the point 19 of the probe facing upwardly. When the spindle 13 has reached the required depth i.e. not the full depth already cut by the tool, a jerk upwardly on the handle causes the probe 17 to pivot about 18 and to swing downwardly until its pointed end 19 engages with the side of the core and enters and cracks it. Thereupon, the spindle 13 and its component parts is withdrawn from the groove and reconnected to the casing 1 whereupon the entire tool is then reinserted into the groove and the cracked upper portion of the core removed by suction when the tool is pulled upwardly. When this core has been removed from the tool, the latter is again inserted into the hole and the latter is then cut even deeper by the method described above.

It is possible to remove overlapping cores of ice as indicated in FIG. 6, thereby providing a hole in the ice which is substantially in the form of a pair of figure-eights. This arrangement is perfect for trappers who require larger holes than "Weekend Fishermen" and where any angle of hole is possible to be cut.

If desired, the boss 10 can be replaced with a ratchet and the spindle 13 provided with a pawl so that the handle means 12 can be operated similar to a brace and bit. Moreover, although the lands 3 are left-handed since it is easier for a right-handed person to operate, they could be right-handed for a left-handed operator and although the spindle 13 is shown as having a square cross-section, it could have a circular cross-section.

From the above description, it will be appreciated that the cut hole can be disposed at any angle and that such a hole and its surrounding area will be quite clear of ice-swarf.

Besides ice-fishing, the tool can be utilized to test the ice for its strength by establishing its thickness through the medium of the core and it can also be employed to test for the amount of acid rain since the core will reveal the various strata containing said rain.

The tool can also assist in providing summer ice, via the intermediary of the cores providing that the latter are placed in cold storage. Finally, the tool can be used as a lifesaving device by removing the handle means 12 entirely and screwing home the screw 14 fully. Thus, the upper end of the tool will be sealed and will contain a pocket of air sufficient to keep a person afloat at least until rescued.

The embodiments of the invention in which an exclusive property or privilege is claimed are defined as follows:

1. A combined ice-cutter and corer including:
   (a) a hollow cylindrical body having an open lower end and a substantially closed upper end;
   (b) a plurality of downwardly projecting ice cutting teeth arranged around the perimeter of the lower end of said body;
   (c) handle means on the upper end of said body for manually rotating said body;
   (d) a pair of primary lands extending helically upwardly on the outer surface of said body from a diametrically opposed pair of said teeth to said upper end; and
   (e) a pair of secondary lands each being located midway between a pair of primary lands and extending helically upwardly on the outer surface of said body from a diametrically opposed pair of said teeth part way up said body;
whereby rotation of said body during a cutting operation causes said teeth to cut an ice core for entry into said body, and ice-swarf cut by said teeth is removed by said lands.

2. A device as claimed in claim 1 wherein said pair of secondary lands extend helically upwardly from said pair of diametrically opposed teeth for one quarter the circumference of said body, whereby ice-swarf removed by each secondary land is deposited on the next primary land for removal from around said core.

3. A device as claimed in claim 2, wherein each cutting tooth is provided with a curved surface for transferring ice-swarf from said teeth to said lands.

4. A device as claimed in claim 3, wherein said handle is axially slidable in said body, means are provided for securing said handle to the closed end of said body for rotation of said body, and said handle is provided with a pivotted ice probe for assisting in the removal of an ice core.

5. A device as claimed in claim 4, wherein said body is coated with a thermoplastic material.

6. A device as claimed in claim 4 including 8 ice cutting teeth arranged around the perimeter of the lower end of said body.

* * * * *

UNITED STATES PATENT AND TRADEMARK OFFICE
Certificate

Patent No. 4,539,750             Patented September 10, 1985

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Reino E. Jarvi.

Signed and Sealed this 25th Day of November, 1986.

BRADLEY R. GARRIS,
*Office of the Deputy Assistant Commissioner for Patents.*